(12) United States Patent
Oogose et al.

(10) Patent No.: US 10,375,942 B2
(45) Date of Patent: Aug. 13, 2019

(54) DUAL-BEARING REEL

(71) Applicant: Shimano Inc., Sakai, Osaka (JP)

(72) Inventors: Hiroki Oogose, Osaka (JP); Akira Niitsuma, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/150,819

(22) Filed: Oct. 3, 2018

(65) Prior Publication Data

US 2019/0141973 A1    May 16, 2019

(30) Foreign Application Priority Data

Nov. 10, 2017    (JP) ................................ 2017-217786

(51) Int. Cl.
  *A01K 89/01*      (2006.01)
  *A01K 89/015*     (2006.01)
  *A01K 89/00*      (2006.01)

(52) U.S. Cl.
  CPC ...... *A01K 89/01923* (2015.05); *A01K 89/006* (2013.01); *A01K 89/0193* (2015.05)

(58) Field of Classification Search
  CPC ........ A01K 89/01923; A01K 89/01924; A01K 89/0193
  See application file for complete search history.

(56) References Cited

U.S. PATENT DOCUMENTS

| | | | | |
|---|---|---|---|---|
| 5,120,002 A | * | 6/1992 | Kawai | A01K 89/01921 242/314 |
| 5,370,331 A | * | 12/1994 | Sato | A01K 89/01923 242/313 |
| 5,743,479 A | * | 4/1998 | Miyazaki | A01K 89/01923 242/312 |
| 5,839,682 A | * | 11/1998 | Kim | A01K 89/01923 242/314 |
| 6,095,444 A | * | 8/2000 | Miyazaki | A01K 89/0183 242/312 |
| 6,206,312 B1 | * | 3/2001 | Oh | A01K 89/01921 242/314 |
| 6,293,484 B1 | * | 9/2001 | Oh | A01K 89/01921 242/312 |
| 6,367,726 B1 | * | 4/2002 | Hyon | A01K 89/01923 242/314 |

(Continued)

FOREIGN PATENT DOCUMENTS

JP    11-276040 A    10/1999

*Primary Examiner* — Emmanuel M Marcelo
(74) *Attorney, Agent, or Firm* — Global IP Counselors, LLP (57) ABSTRACT

A dual-bearing reel includes a spool, a spool shaft, a spool supporting portion, a reel body, a rotating member, and a retaining member. The spool supporting portion is configured to support an end side of the spool shaft. The rotating member is disposed between the reel body and the spool supporting portion. The rotating member is rotatably arranged with respect to the spool supporting portion to detachably attach the spool supporting portion to the reel body. The retaining member is disposed between the spool supporting portion and the spool axis. The retaining member is configured to engage the spool supporting portion and the rotating member and prevent the rotating member from detaching from the spool supporting portion.

11 Claims, 9 Drawing Sheets

(56) References Cited

U.S. PATENT DOCUMENTS

| | | | |
|---|---|---|---|
| 8,235,320 B2* | 8/2012 | Kawasaki | A01K 89/0192 |
| | | | 242/310 |
| 9,198,407 B2* | 12/2015 | Hyun | A01K 89/015 |
| 2003/0111569 A1* | 6/2003 | Hitomi | A01K 89/011223 |
| | | | 242/321 |

* cited by examiner

DUAL-BEARING REEL

CROSS-REFERENCE TO RELATED APPLICATIONS

This application claims priority to Japanese Patent Application No. 2017-217786, filed on Nov. 10, 2017. The entire disclosure of Japanese Patent Application No. 2017-217786 is hereby incorporated herein by reference.

BACKGROUND

Field of the Invention

The present invention relates to a dual-bearing fishing reel.

Background Art

A conventional dual-bearing fishing reel comprises a spool, a spool shaft, a left frame (body portion), a left side cover (spool supporting portion) that is mounted on the left frame, a left ring-shaped member (rotating member) for mounting a left side plate onto the reel body, and a retaining ring (retaining member) for preventing the left side plate from detaching from the left ring-shaped member (refer to Japanese Published Unexamined Application No. Hei 11(1999)-276040).

In the conventional dual-bearing reel, the retaining ring is disposed between a recess disposed on an outer circumferential portion of the left side plate and a recess disposed on an inner circumferential portion of the left ring-shaped member (refer to Japanese Published Unexamined Application No. Hei 11(1999)-276040, FIGS. 4 and 5(b)).

In this design, when removal of the left side plate from the left ring-shaped member is attempted, the retaining ring abuts a wall portion of a recess on the left side plate and a wall portion of a recess on the left ring-shaped member. Consequently, it is difficult to remove the left side plate from the left ring-shaped member. For the same reason, it is difficult to attach the left side plate to the left ring-shaped member.

In addition, as described above, there is also the risk that the retaining ring will break due to the retaining ring abutting the wall portion of the recess on the left side plate and abutting the wall portion of the recess on the left ring-shaped member. That is, in the conventional dual-bearing reel, it is difficult to attach/detach the left side plate to/from the left ring-shaped member and there is the risk that the retaining ring will break during attachment/detachment. Furthermore, as shown in FIG. 5(a) of Japanese Published Unexamined Application No. Hei 11(1999)-276040, in the case of configuring a recess by screwing the left ring-shaped member to the left side plate, it is necessary to prepare a space for fixing the screw in the axial direction.

SUMMARY

The present invention was made in light of the above-described problems, and an object of the present invention is to provide a dual-bearing fishing reel with which it is possible to easily attach/detach a rotating member to/from a spool supporting portion. In addition, another object of the present invention is to provide a dual-bearing fishing reel with which it is possible to prevent breakage of a retaining member when attaching/detaching a rotating member to/from the spool supporting portion. Also, another object of the present invention is to retain the rotating member and the spool supporting portion in compact fashion.

In accordance with one aspect of the present invention, the dual-bearing reel comprises a spool, a spool shaft, a spool supporting portion, a body portion, a rotating member, and a retaining member.

A fishing line is wound around the spool. The spool shaft is disposed at the rotational center of the spool. The spool supporting portion is capable of supporting one end side of the spool shaft. The spool supporting portion is detachably attached to the body portion. The rotating member is disposed between the body portion and the spool supporting portion. The rotating member is rotatably arranged with respect to the spool supporting portion in order to detachably attach the spool supporting portion to the body portion. The retaining member is disposed between the rotational center of the spool and the spool supporting portion. The retaining member engages with the spool supporting portion and the rotating member and prevents the rotating member from detaching from the spool supporting portion.

In the dual-bearing reel of the present invention, the retaining member is disposed between the rotational center of the spool and the spool supporting portion. The rotating member is disposed between the body portion and the spool supporting portion. In this state, the retaining member prevents the rotating member from detaching from the spool supporting portion.

In this manner, in the present dual-bearing reel, the retaining member is not disposed between the rotating member and the spool supporting portion, as in the prior art. Thus, it is possible to easily attach/detach the rotating member to/from the spool supporting portion by attaching the retaining member to the spool supporting portion or removing the retaining member from the spool supporting portion.

In addition, in the present dual-bearing reel, the retaining member does not abut the rotating member and the spool supporting portion when attaching/detaching the rotating member to/from the spool supporting portion, so that it is possible to prevent the retaining member from breaking.

Furthermore, since the retaining member is disposed between the rotational center of the spool and the spool supporting portion in the present dual-bearing reel, it is possible to retain the rotating member and the spool supporting portion in compact fashion.

In accordance with another aspect of the present invention, the spool supporting portion of the dual-bearing reel is preferably disposed between the rotational center of the spool and the rotating member in the radial direction.

With his configuration, it is possible to easily attach/detach the rotating member to/from the spool supporting portion and to prevent the retaining member from breaking. In addition, it is possible to retain the rotating member and the spool supporting portion in compact fashion.

In accordance with another aspect of the present invention, the spool supporting portion of the dual-bearing reel preferably has a hole portion that extends in the radial direction from the rotational center of the spool toward the rotating member. In this embodiment, the retaining member includes a mounting portion and a restricting portion.

The mounting portion is mounted on the spool supporting portion between the spool supporting portion and the rotational center of the spool in the radial direction. The restricting portion extends from the mounting portion toward the rotating member. The restricting portion restricts the axial movement of the rotating member by engaging the rotating member via the hole portion.

With his configuration, it is possible to easily attach/detach the rotating member to/from the spool supporting portion and to more reliably prevent the retaining member from breaking. In addition, it is possible to retain the rotating member and the spool supporting portion in compact fashion.

In accordance with another aspect of the present invention, the restricting portion of the dual-bearing reel preferably engages the rotating member via a hole portion.

With his configuration, it is possible to easily attach/detach the rotating member to/from the spool supporting portion and to prevent the retaining member from breaking. In addition, it is possible to retain the rotating member and the spool supporting portion in compact fashion.

In accordance with another aspect of the present invention, the rotating member of the dual-bearing reel preferably has an engagement portion. In this embodiment, the engagement portion is disposed between the restricting portion and the spool in the axial direction. The restricting portion engages the engagement portion.

With his configuration, it is possible to reliably prevent the rotating member from detaching from the spool supporting portion by using the retaining member. In addition, it is possible to easily retain the rotating member and the spool supporting portion in compact fashion.

In accordance with another aspect of the present invention, the engagement portion of the dual-bearing reel is preferably a wall portion that is formed in essentially an annular shape.

With his configuration, it is possible to more reliably prevent the rotating member from detaching from the spool supporting portion by using the retaining member. In addition, it is possible to easily retain the rotating member and the spool supporting portion in compact fashion.

In accordance with another aspect of the present invention, the engagement portion of the dual-bearing reel preferably has an annular groove that is formed in essentially an annular shape. In this embodiment, the annular groove includes the wall portion described above. The restricting portion is disposed in the annular groove.

With his configuration, it is possible to more reliably prevent the rotating member from detaching from the spool supporting portion by using the retaining member. In addition, it is possible to easily retain the rotating member and the spool supporting portion in compact fashion.

In accordance with another aspect of the present invention, the spool supporting portion of the dual-bearing reel preferably has a tubular portion that is formed in essentially a tubular shape. The mounting portion is disposed on the inner circumferential portion of the tubular portion.

With this configuration, it is possible to easily dispose the retaining member on the spool supporting portion. In addition, it is possible to retain the rotating member and the spool supporting portion in compact fashion.

In accordance with another aspect of the present invention, the restricting portion of the dual-bearing reel is disposed in the hole portion by elastic deformation of the retaining member.

With this configuration, it is possible to easily attach/detach the retaining member to/from the spool supporting portion.

In accordance with another aspect of the present invention, the tubular portion of the dual-bearing reel preferably has a guide groove for guiding the restricting portion to the hole portion.

With this configuration, it is possible to more easily attach/detach the retaining member to/from the spool supporting portion. In addition, it is possible to retain the rotating member and the spool supporting portion in compact fashion.

In accordance with another aspect of the present invention, the mounting portion of the dual-bearing reel is positioned on the spool supporting portion by a fixing member.

With this configuration, it is possible to mount the retaining member on the spool supporting portion more reliably.

In accordance with the present invention, a rotating member of a dual-bearing reel can be easily attached to/detached from a spool supporting portion, and breakage of the retaining member can be prevented. In addition, the rotating member and the spool supporting portion of the dual-bearing reel can be retained in compact fashion.

DETAILED DESCRIPTION OF THE EMBODIMENTS

Overall Structure of the Dual-Bearing Reel

Figure 1:
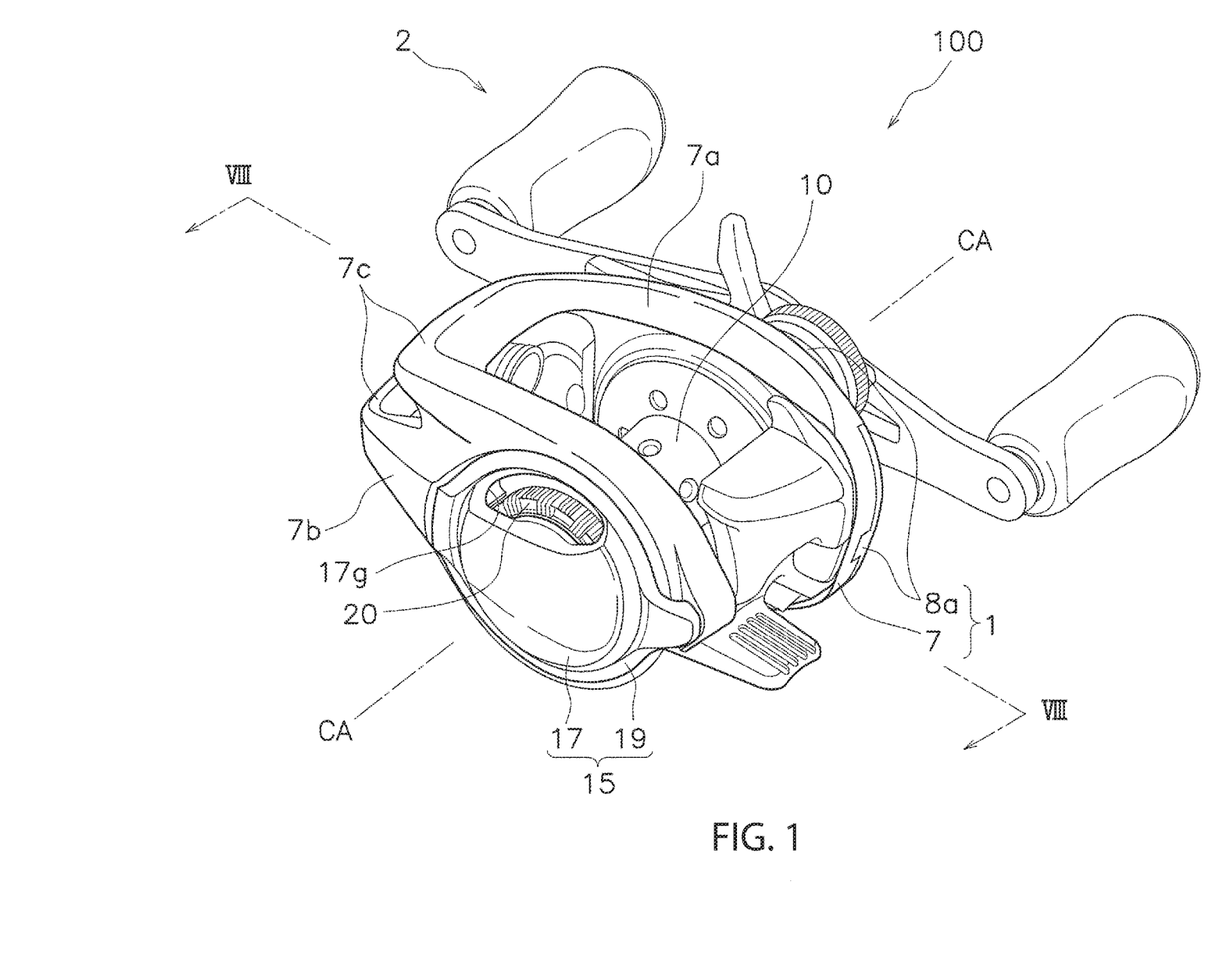
FIG. 1 is a perspective view of a dual-bearing reel.

As shown in FIG. 1, the dual-bearing reel 100 according to an embodiment of the present invention comprises a reel body 1 (one example of a body portion), a handle 2, a spool 10, a spool shaft 14 (refer to FIGS. 4 and 8), and a spool supporting structure 15.

The "axial direction" used hereinbelow is defined as a direction in which the rotational center of the spool 10, i.e., the spool axis CA, extends, or a direction along the spool axis CA. The spool axis CA is coaxial with the axis of the spool shaft 14. Thus, the "axial direction" can be interpreted to be a direction in which the spool shaft 14 extends or a direction along the spool shaft 14.

The "radial direction" is defined as a direction away from the spool axis CA and a direction away from the spool axis CA. The "circumferential direction" is defined as a direction around the spool axis CA.

As shown in FIG. 1, the handle 2, the spool 10, the spool shaft 14 (refer to FIGS. 4 and 8), and the spool supporting structure 15 are mounted on the reel body 1. Details of the reel body 1 will be described below.

The handle 2 is configured to rotate the spool 10. In particular, the handle 2 is configured to rotationally drive the spool 10 and is rotatably disposed on the side portion of the reel body 1. The handle 2 is disposed on a side cover 8a side, which is described below.

It should be noted that the direction of rotation in which the handle 2 rotates when the handle 2 is rotated with the dual-bearing reel 100 mounted on a fishing rod is referred to as the "line winding direction." In addition, the direction in which the fishing line is unreeled or cast is defined as the front, and the opposite direction is defined as the rear. The direction approaching the fishing rod is defined as down, and the direction away from the fishing rod is defined as up.

A fishing line is wound around the spool 10. The spool 10 has the spool axis CA described above. The spool 10 is rotatably supported by the reel body 1. Here, the spool 10 is mounted on the spool shaft 14 so as to be integrally rotatable therewith. The spool 10 is rotatably supported by the reel body 1 via the spool shaft 14. The spool shaft 14 is disposed on the spool axis CA. Here, the spool shaft 14 is configured to be integrally rotatable with the spool 10. The spool shaft 14 is rotatably supported by the reel body 1.

Reel Body

As shown in FIG. 1, the reel body 1 comprises a frame 7 and a side cover 8a.

The frame 7 has a first side plate 7a, a second side plate 7b, and a plurality of connecting portions 7c. The spool 10 is disposed between the first side plate 7a and the second side plate 7b. The first side plate 7a is disposed on the handle 2 side. The first side plate 7a rotatably supports the spool shaft 14 via an axle bearing, not shown.

The second side plate 7b is disposed on the opposite side of the handle 2. The second side plate 7b is disposed spaced from the first side plate 7a in the axial direction.

Figure 2A:
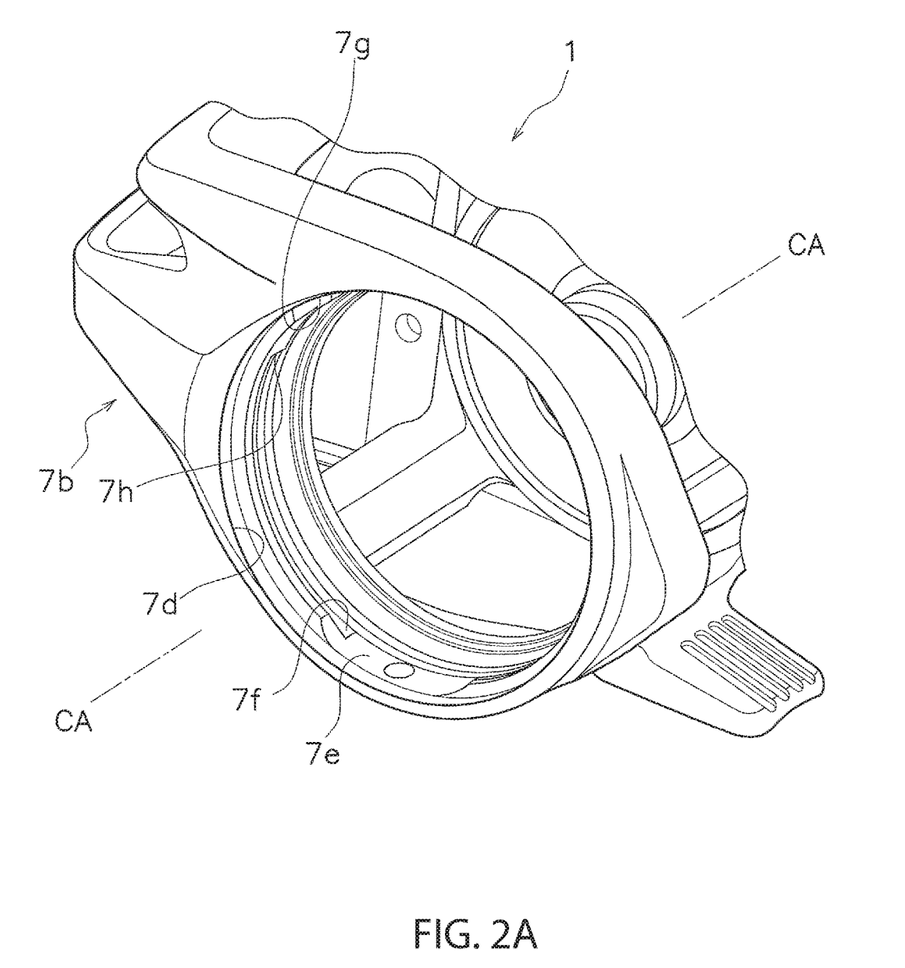
FIG. 2A is a perspective view of a second side plate.
Figure 2B:
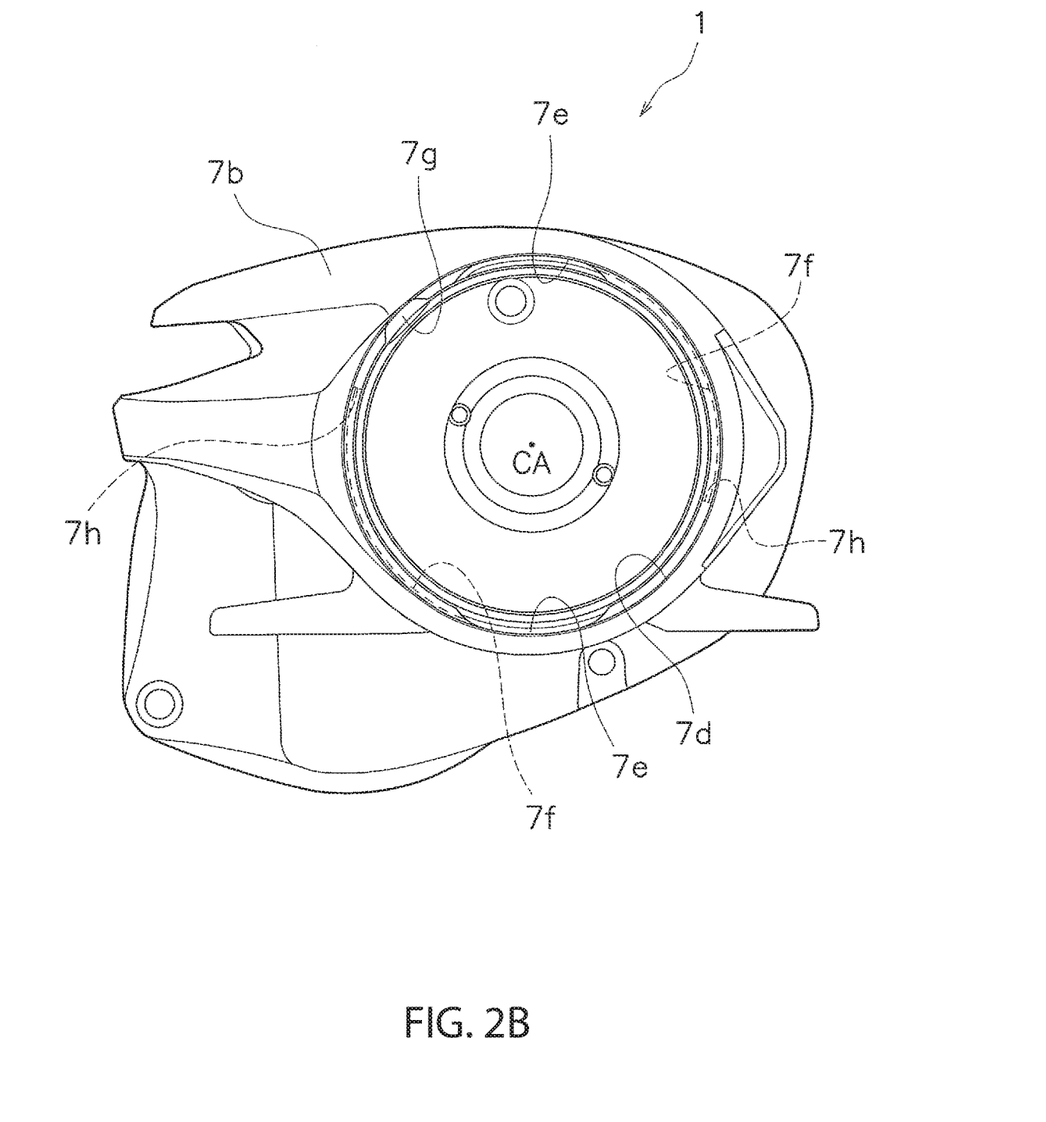
FIG. 2B is a side view of the second side plate.

As shown in FIGS. 2A and 2B, the second side plate 7b has an opening 7d for attaching and detaching the spool 10. The opening 7d extends through the second side plate 7b in the spool shaft direction. The opening 7d is formed in essentially a cylindrical shape.

The rotating member 19 is disposed in the opening 7d. The opening 7d includes a guide recess 7e, a bayonet groove 7f, and a positioning recess 7g. The guide recess 7e guides a bayonet protrusion 19d (described below) of the rotating member 19 to the bayonet groove 7f. The guide recess 7e is disposed on the inner circumferential surface of the opening 7d. Here, a plurality of guide recesses 7e (for example, two) are formed on the inner circumferential surface of the opening 7d.

As shown in FIG. 2A, each guide recess 7e is a groove that extends in the axial direction. Each guide recess 7e extends in the axial direction from the outer surface of the second side plate 7b toward the bayonet groove 7f.

As shown in FIG. 2B, the guide recesses 7e are disposed spaced from each other in the circumferential direction. For example, the guide recesses 7e are arranged at 180-degree intervals in the circumferential direction. That is, the guide recesses 7e are disposed facing each other in the radial direction. Here, one guide recess 7e is disposed on the fishing rod side, that is, on the lower side of the opening 7d. The other guide recess 7e is disposed away from the fishing rod, that is, on the upper side of the opening 7d. The configuration of the other guide recess 7e is the same as the configuration of the one guide recess 7e.

As shown in FIGS. 2A and 2B, the bayonet groove 7f guides the bayonet protrusion 19d of the rotating member 19 in the circumferential direction. The bayonet groove 7f is disposed on the inner circumferential surface of the opening 7d. Here, a plurality of bayonet grooves 7f (for example, two) are disposed on the inner circumferential surface of the opening 7d.

Each bayonet groove 7f extends in the circumferential direction. Each bayonet groove 7f extends in the circumferential direction from each guide recess 7e. For example, one bayonet groove 7f extends from the lower guide recess 7e toward the upper guide recess 7e. In particular, as shown in FIG. 2B, when the second side plate 7b is seen from the axially outward side, the one bayonet groove 7f extends from the lower guide recess 7e in the clockwise circumferential direction. The distal end portion 7h of the one bayonet groove 7f is disposed spaced from the upper guide recess.

The configuration of the other bayonet groove 7f is essentially the same as the configuration of the one bayonet groove 7f described above. The other bayonet groove 7f extends from the upper guide recess 7e toward the lower guide recess 7e. In particular, as shown in FIG. 2B, when the second side plate 7b is seen from the axially outward side, the other bayonet groove 7f extends from the upper guide recess 7e in the clockwise circumferential direction. The distal end portion 7h of the other bayonet groove 7f is disposed spaced from the lower guide recess 7e.

The bayonet protrusion 19d can abut the distal end portion 7h of each of a plurality of bayonet grooves 7f. The rotating member 19 is thereby positioned in the circumferential direction.

As shown in FIGS. 2A and 2B, the positioning recess 7g is for restricting the rotation of the spool supporting portion 17. The positioning recess 7g is disposed on the inner circumferential surface of the opening 7d. Here, at least one (for example, one) positioning recess 7g is formed on the inner circumferential surface of the opening 7d. The positioning recess 7g is a groove that extends in the axial direction. The positioning recess 7g is disposed between the distal end portion 7h of the one bayonet groove 7f and the upper guide recess in the circumferential direction.

As shown in FIG. 1, the plurality of connecting portions 7c connect the first side plate 7a and the second side plate 7b. The plurality of connecting portions 7c connect the first side plate 7a and the second side plate 7b to each other at the front, rear, and lower portions of the first side plate 7a and the second side plate 7b. A rod mounting leg portion for a fishing rod is integrally formed on the lower connecting portion.

As shown in FIG. 1, the side cover 8a covers the frame 7 on the handle 2 side. In particular, the side cover 8a is mounted on the first side plate 7a and covers the first side plate 7a. The side cover 8a rotatably supports one end of the spool shaft 14 via an axle bearing, not shown.

Configuration of the Spool Supporting Structure

Figure 8:
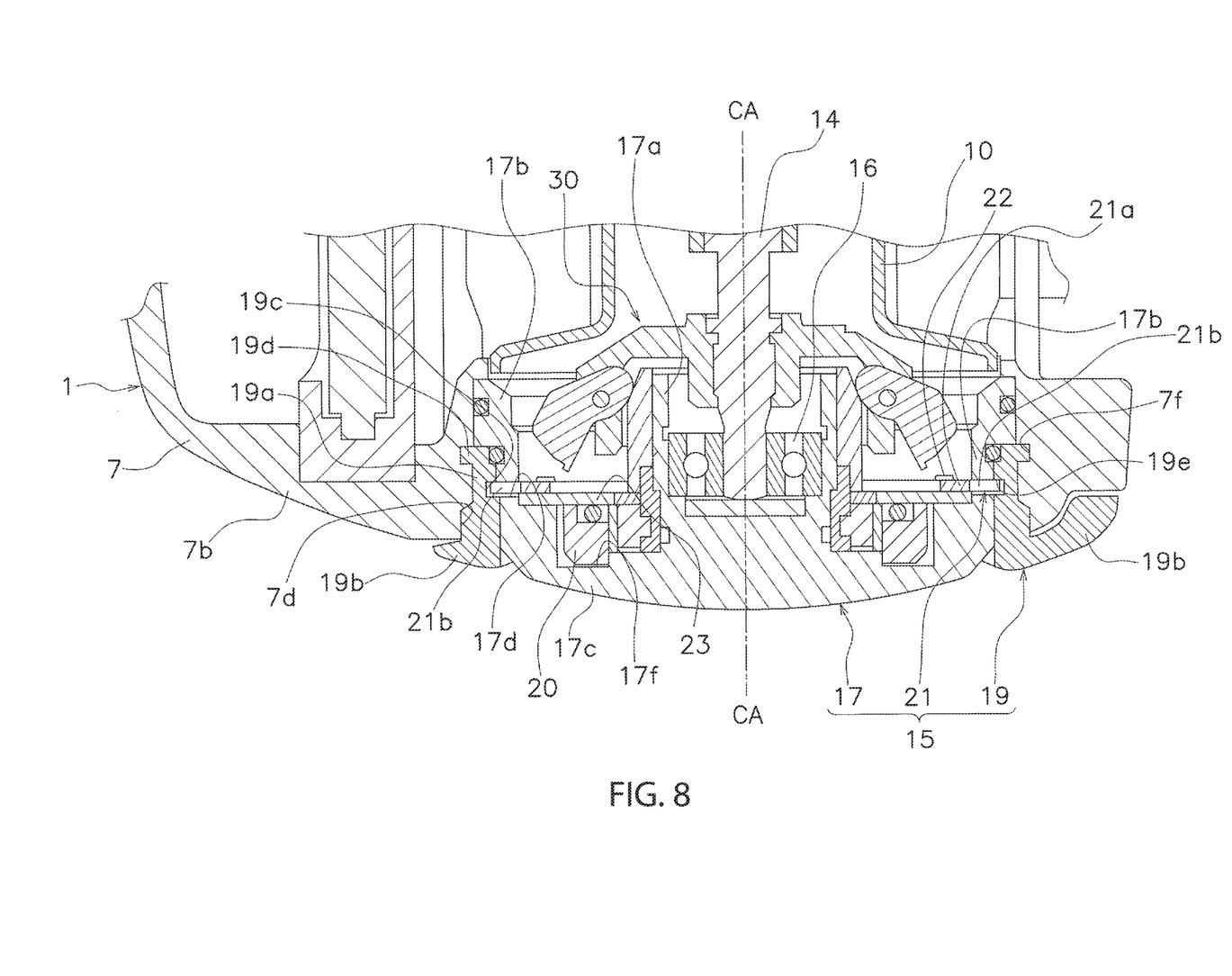
FIG. 8 is a partially enlarged cross-sectional view taken along the section line VIII-VIII in FIG. 1.

The spool supporting structure 15 supports the spool shaft 14 (refer to FIG. 8). In particular, the spool supporting structure 15 rotatably supports the other end side of the spool shaft 14.

As shown in FIG. 1, the spool supporting structure 15 is detachably mounted on the reel body 1. Here, the spool supporting structure 15 is detachably mounted on the frame 7 on the opposite side of the handle 2. In particular, as shown in FIGS. 1, 2A, and 3, the spool supporting structure 15 is detachably mounted to the opening 7d of the second side plate 7b and covers the opening 7d of the second side plate 7b.

Figure 3:
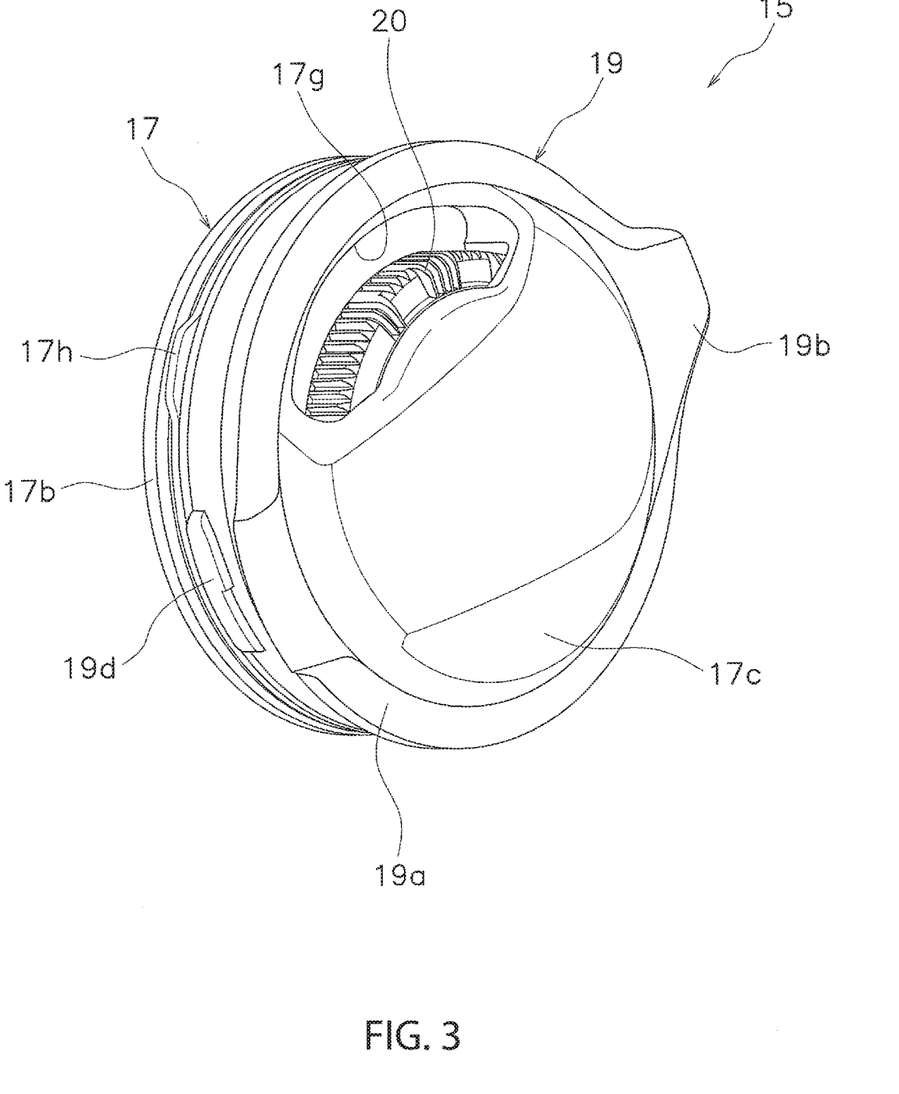
FIG. 3 is a perspective view of a spool supporting structure.
Figure 4:
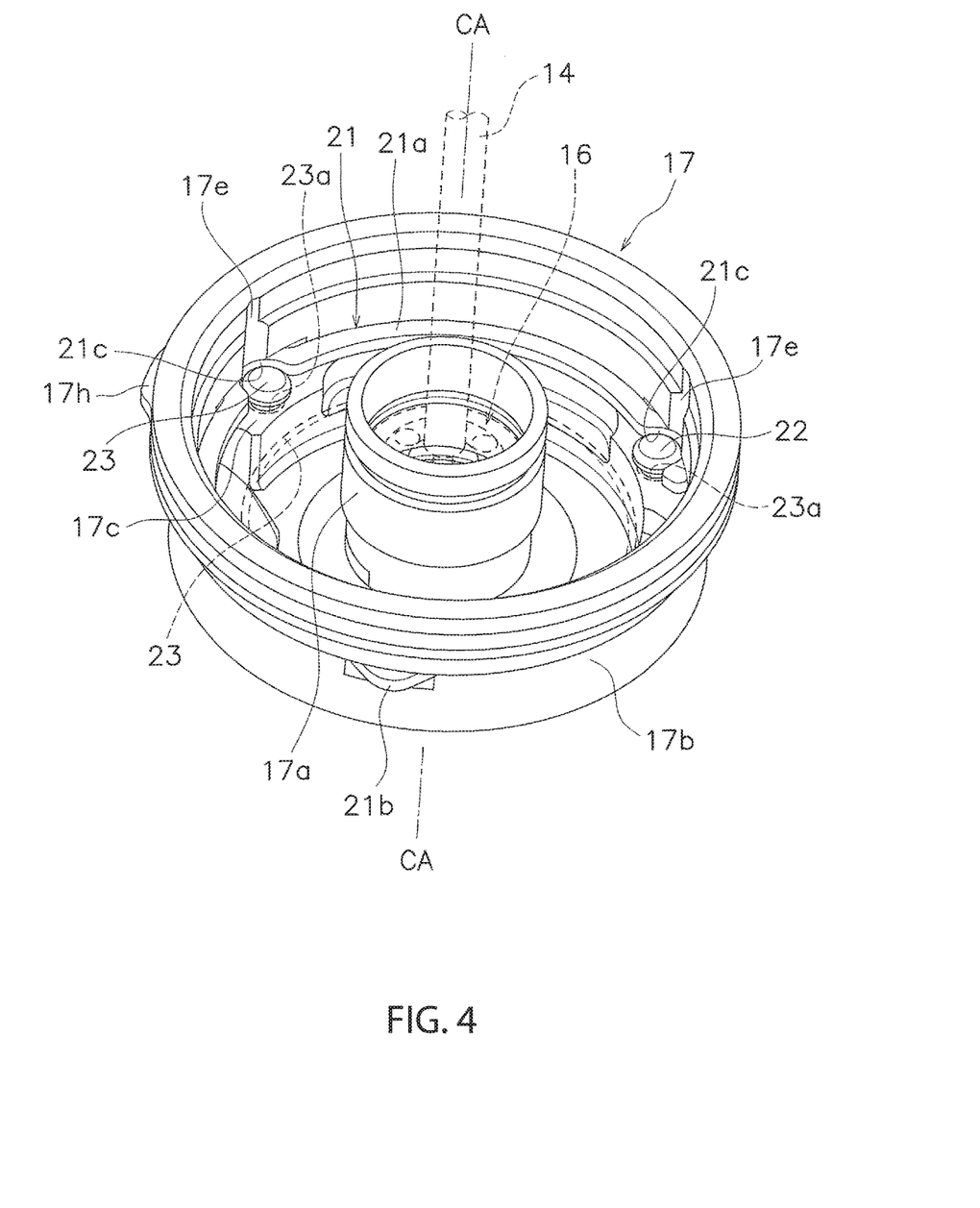
FIG. 4 is a perspective view of a spool supporting portion on which a retaining member is disposed.

As shown in FIGS. 3 and 4, the spool supporting structure 15 comprises a spool supporting portion 17, a rotating member 19, and a retaining member 21.

Spool Supporting Portion

As shown in FIGS. 1, 3, and 8, the spool supporting portion 17 is detachably mounted on the reel body 1 via the rotating member 19. The spool supporting portion 17 is disposed between the spool axis CA and the rotating member 19 in the radial direction.

As shown in FIGS. 4 and 8, the spool supporting portion 17 is configured to support the other end of the spool shaft 14. The spool supporting portion 17 is detachably mounted on the reel body 1 via the rotating member 19. The spool supporting portion 17 is configured to hold the retaining member 21. The spool supporting portion 17 rotatably holds the rotating member 19 via the retaining member 21.

Figure 5:
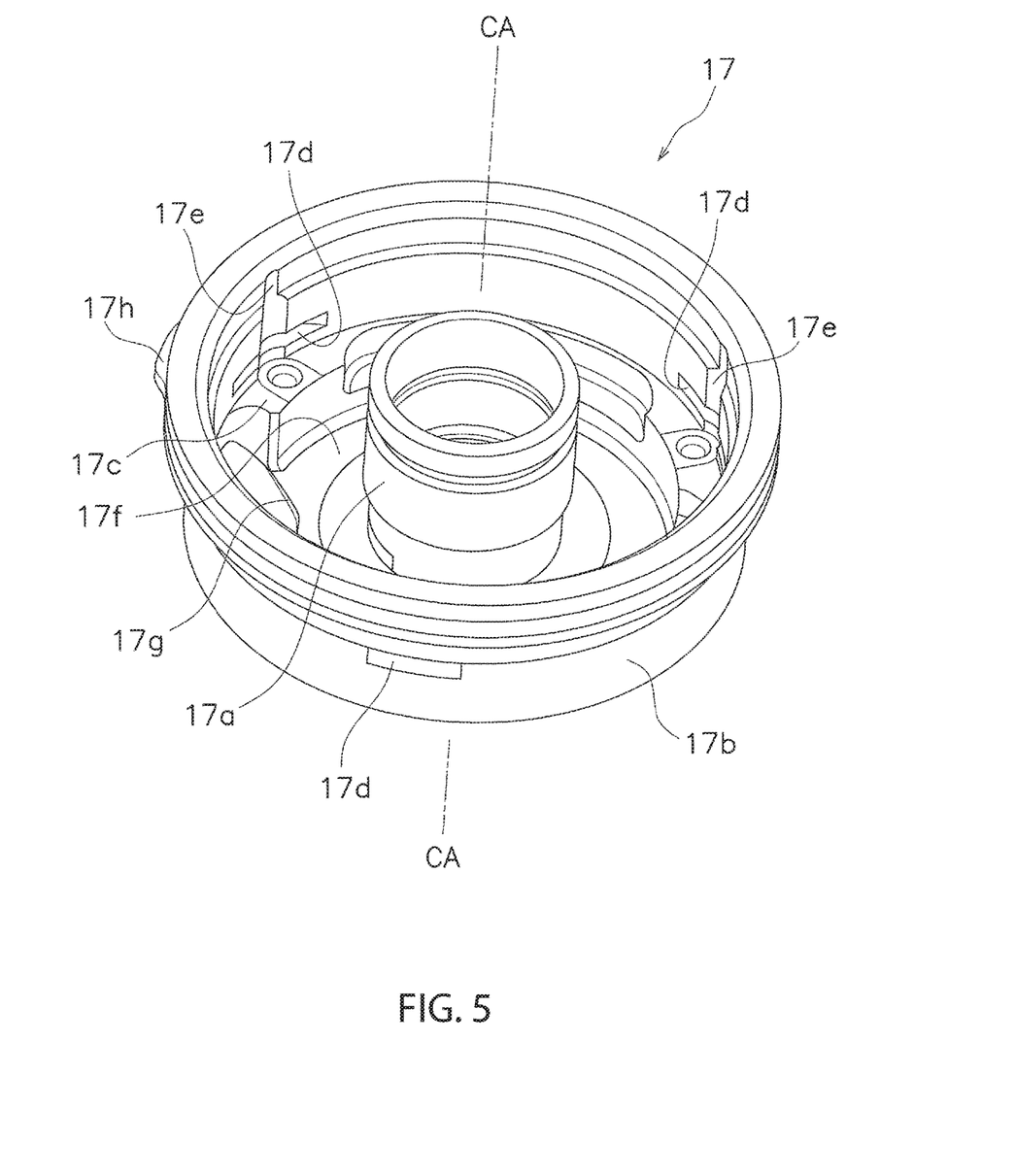
FIG. 5 is a perspective view of a spool supporting portion.

As shown in FIGS. 4, 5, and 8, the spool supporting portion 17 comprises a shaft supporting portion 17a, a tubular portion 17b, and a disc portion 17c.

As shown in FIGS. 4 and 8, the shaft supporting portion 17a rotatably supports the other end of the spool shaft 14. Specifically, the shaft supporting portion 17a is formed with essentially a tubular shape. The center of the shaft supporting portion 17a is coaxial with the spool axis CA.

The other end of the spool shaft 14 is disposed on the inner circumferential portion of the shaft supporting portion 17a. An axle bearing 16 is disposed between the inner circumferential surface of the shaft supporting portion 17a and the outer circumferential surface of the other end of the spool shaft 14. That is, the shaft supporting portion 17a rotatably supports the other end of the spool shaft 14 via the axle bearing 16.

The tubular portion 17b is formed with essentially a tubular shape. The tubular portion 17b is disposed spaced from the shaft supporting portion 17a in the radial direction. The rotating member 19 is disposed on the radially outer side of the tubular portion 17b (refer to FIG. 8).

As shown in FIG. 5, the tubular portion 17b includes a hole portion 17d, a guide groove 17e, and a positioning protrusion 17h. Here, the tubular portion 17b includes a plurality (for example, three) of hole portions 17d, a plurality (for example, three) of guide grooves 17e, and at least one (for example, one) positioning protrusion 17h.

Each hole portion 17d is for inserting each restricting portion 21b (described below) of the retaining member 21 therethrough, from the inner circumferential side of the tubular portion 17b toward the rotating member 19 (refer to FIG. 8). Each hole portion 17d extends through the tubular portion 17b in the radial direction. That is, each hole portion 17d extends in the radial direction from the spool axis CA toward the rotating member 19. The hole portions 17d are disposed at intervals in the circumferential direction. For example, the hole portions 17d are disposed at 60-degree intervals in the circumferential direction.

As shown in FIG. 5, each guide groove 17e guides each restricting portion 21b to each hole portion 17d. The guide groove 17e extends in the axial direction. Each guide groove 17e extends in the axial direction from an end portion of the tubular portion 17b (for example, the spool 10 side) toward each hole portion 17d. The guide grooves 17e are disposed at intervals in the circumferential direction. For example, the guide grooves 17e are disposed at 60-degree intervals in the circumferential direction.

As shown in FIG. 5, the positioning protrusion 17h restricts the rotation of the spool supporting portion 17 relative to the reel body 1. The positioning protrusion 17h is disposed on the outer circumferential portion of the tubular portion 17b. In particular, the positioning protrusion 17h is integrally formed with the outer circumferential portion of the tubular portion 17d and protrudes radially outward from the outer circumferential portion of the tubular portion 17d. The positioning protrusion 17h is disposed in a positioning recess 7g (refer to FIGS. 2A and 2B) of the reel body 1 (opening 7d).

As shown in FIGS. 5 and 8, the disc portion 17c connects the shaft supporting portion 17a and the tubular portion 17b. The disc portion 17c is formed in essentially a disc-shaped. The shaft supporting portion 17a is integrally formed on the inner circumferential portion of the disc portion 17c. The tubular portion 17b is integrally formed on the outer circumferential portion of the disc portion 17c.

As shown in FIGS. 1 and 3, an opening 17g for operating an adjustment dial 20 is disposed on the disc portion 17c. In addition, as shown in FIG. 5, an annular recess 17f for disposing the adjustment dial 20 therein is formed on the inner surface of the disc portion 17c. Here, the adjustment dial 20 is an operation member for adjusting the braking force of the spool 10. The adjustment dial 20 constitutes a spool braking mechanism 30 (refer to FIG. 8) for adjusting the braking force of the spool 10. The configuration, operation, etc., of the spool braking mechanism 30 are not particularly described in detail in the present embodiment.

Rotating Member

The rotating member 19 is configured to connect the spool supporting portion 17 to the reel body 1. The rotating member 19 is for attachment of the spool supporting portion 17 to the reel body 1 and removal of the spool supporting portion 17 from the reel body 1.

As shown in FIGS. 1 and 8, the rotating member 19 is disposed between the reel body 1 and the spool supporting portion 17. In particular, the rotating member 19 is disposed between the opening 7d of the second side plate 7b and the spool supporting portion 17 in the radial direction.

As shown in FIG. 3, the rotating member 19 is rotatably attached to the spool supporting portion 17. In addition, the rotating member 19 is rotatably arranged with respect to the reel body 1, for example, the opening 7d of the second side plate 7b (refer to FIGS. 2A and 8).

Figure 6:
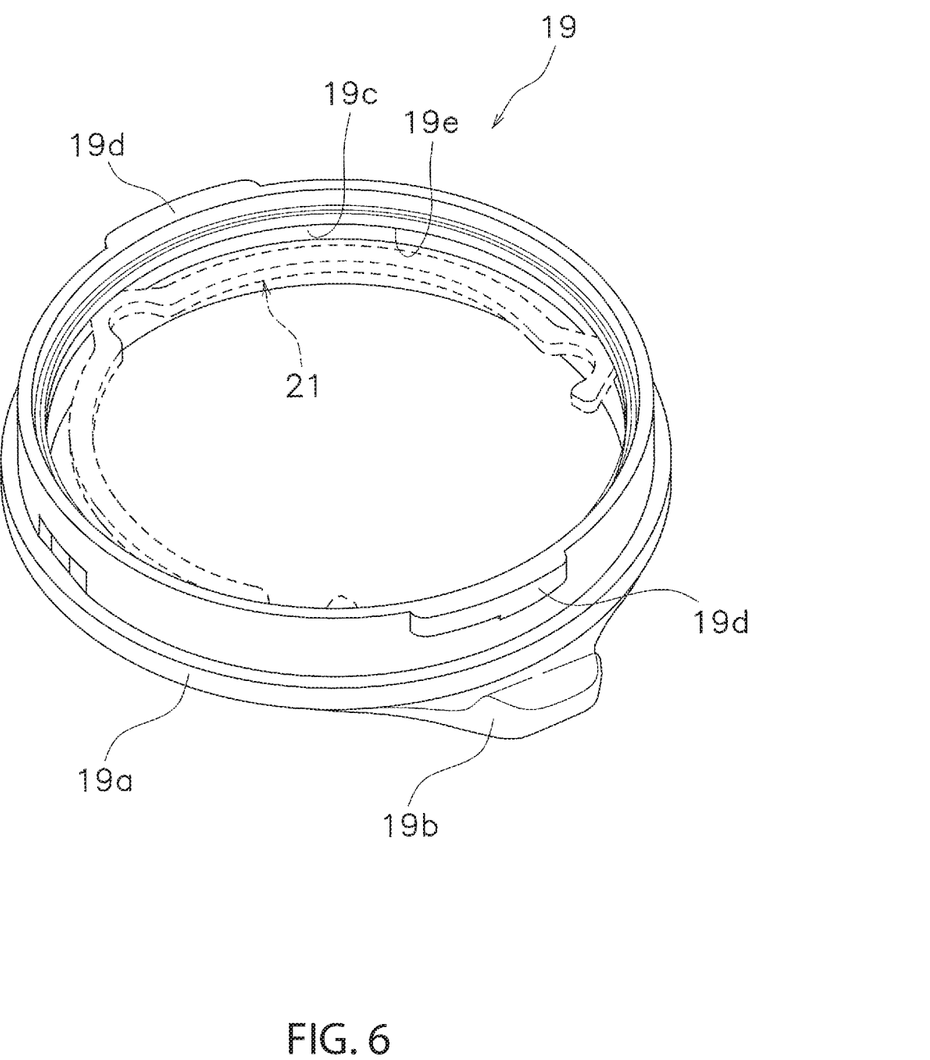
FIG. 6 is a perspective view of a rotating member.

As shown in FIGS. 3 and 6, the rotating member 19 includes a rotating portion 19a and an operating portion 19b. The rotating portion 19a is formed in essentially an annular shape. The rotating portion 19a is disposed on the outer circumferential portion of the spool supporting portion 17, for example on the outer circumferential surface of the tubular portion 17b (refer to FIG. 8).

As shown in FIGS. 6 and 8, the rotating portion 19a has an annular groove 19c (one example of an engagement portion) and a bayonet (i.e., a protrusion) 19d. The annular groove 19c is a groove that is formed in an annular shape. The annular groove 19c is formed on the inner circumferential surface of the rotating portion 19a. The annular groove 19c extends in the circumferential direction.

The annular groove 19c has a pair of wall portions that face each other in the axial direction. Each of the pair of wall portions is formed in an annular shape. The wall portion 19e on the spool 10 side is disposed between the restricting portions 21b (described below) of the retaining member 21 and the spool 10 in the axial direction.

As shown in FIGS. 6 and 8, the bayonet 19d is disposed on the outer circumferential portion of the rotating portion 19a. Here, a plurality of bayonets 19d (for example, two) are integrally formed on the outer circumferential portion of the rotating portion 19a.

Each bayonet 19d protrudes radially outward from the outer circumferential portion of the rotating portion 19a. The bayonets 19d are disposed at intervals in the circumferential direction. For example, the bayonets 19d are disposed at 180-degree intervals in the circumferential direction. That is, the bayonets 19d are disposed facing each other in the radial direction.

In the embodiment in which the rotating member 19 is attached to the opening 7d of the second side plate 7b of the reel body 1, for example, each bayonet 19d is disposed in each guide recess 7e (refer to FIGS. 2A and 2B) of the opening 7d and moves in an axial direction approaching the spool 10. Then, upon reaching the positions of the bayonet grooves 7f, the bayonets 19d move along the bayonet grooves 7f in the circumferential direction. The bayonets 19d then abut the distal end portions 7h of the bayonet grooves 7*f*. The bayonets 19*d* are thereby positioned in the opening 7*d* of the second side plate 7*b*.

In the embodiment in which the rotating member 19 is removed from, for example, the opening 7*d* of the second side plate 7*b* of the reel body 1, each bayonet 19*d* moves in each bayonet groove 7*f* in the circumferential direction, from the distal end portion 7*h* of each bayonet groove 7*f* toward each guide recess 7*e*. Then, when the bayonets 19*d* reach the respective guide recesses 7*e*, each bayonet 19*d* moves from each guide recess 7*e* in the axial direction away from the spool 10. The engagement between the bayonets 19*d* and the opening 7*d* of the second side plate 7*b* is thereby released.

As shown in FIGS. 3 and 6, the operating portion 19*b* is operated in order to turn of rotate the rotating portion 19*a* relative to the reel body 1. The operating portion 19*b* is disposed on the rotating portion 19*a*. In particular, the operating portion 19*b* protrudes radially outward from the rotating portion 19*a* and is integrally formed with the rotating portion 19*a*. For example, the rotating portion 19*a* is turned by an angler engaging a finger with the operating portion 19*b* to carry out a rotation operation.

Retaining Member

The retaining member 21 prevents the rotating member 19 from detaching from the spool supporting portion 17. As shown in FIGS. 4, 6, and 8, the retaining member 21 engages the spool supporting portion 17 and the rotating member 19 and prevents the rotating member 19 from detaching from the spool supporting portion 17. The retaining member 21 is disposed between the spool supporting portion 17 and the spool axis CA. The retaining member 21 is attached to the spool supporting portion 17.

Figure 7:
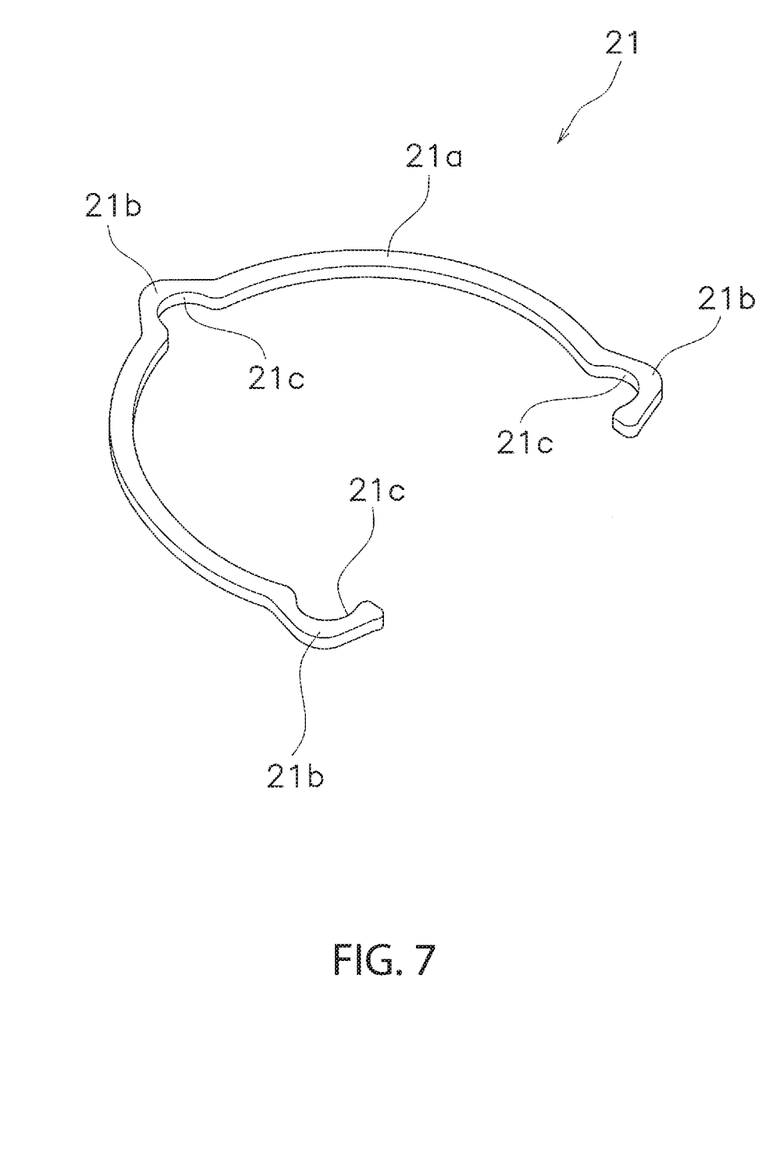
FIG. 7 is a perspective view of a retaining member.

The retaining member 21 is an elastic member, for example, an elastic member made of metal. As shown in FIG. 7, the retaining member 21 includes a mounting portion 21*a* and a restricting portion 21*b*. The mounting portion 21*a* is formed in an essentially arcuate shape. As shown in FIG. 4, the mounting portion 21*a* is mounted on the spool supporting portion 17 between spool supporting portion 17 and the spool axis CA in the radial direction.

The mounting portion 21*a* is disposed on the inner circumferential portion of the tubular portion 17*b* of the spool supporting portion 17 and is attached to the spool supporting portion 17. More specifically, the mounting portion 21*a* is disposed between the tubular portion 17*b* of the spool supporting portion 17 and the shaft supporting portion 17*a* of the spool supporting portion 17 in the radial direction and is positioned on the disc portion 17*c* of the spool supporting portion 17 by a fixing member, for example, a screw member 22.

As shown in FIG. 7, a plurality of first mounting recesses 21*c* (for example, three) are disposed on the mounting portion 21*a*. Each first mounting recess 21*c* is formed in a concave shape on the inner circumferential portion of the mounting portion 21*a*. The first mounting recesses 21*c* are disposed at intervals in a direction along the mounting portion 21*a*. For example, the first mounting recesses 21*c* are disposed at 60-degree intervals in a direction along the mounting portion 21*a*, for example, in the circumferential direction. The head portion of the screw member 22 is disposed in the first mounting recess 21*c* (refer to FIG. 4).

Here, as shown in FIG. 4, the annular lid member 23 is disposed between the mounting portion 21*a* and the inner surface of the disc portion 17*c* of the spool supporting portion 17. The lid member 23 is for positioning the adjustment dial 20 in the axial direction with respect to the disc portion 17*c* of the spool supporting portion 17. The internal diameter of the lid member 23 is smaller than the outer diameter of the adjustment dial 20.

A plurality of second mounting recesses 23*a* (for example, three) are disposed on the lid member 23. Each second mounting recess 23*a* is formed with a concave shape on the outer circumferential portion of the mounting portion 21*a*. The second mounting recesses 23*a* are disposed at intervals in a direction along the outer circumferential portion of the lid member 23.

For example, the second mounting recesses 23*a* are disposed at 60-degree intervals in a direction along the outer circumferential portion of the lid member 23, for example, in the circumferential direction. The second mounting recesses 23*a* are disposed opposing the first mounting recesses 21*c* in the axial direction. The shaft portion of the screw member 22 is disposed in the first mounting recess 21*c*.

With the configuration described above, the movement of the retaining member 21 in the radially inward direction is restricted by the screw member 22. That is, the retaining member 21 is positioned in the radial direction by the screw member 22. The lid member 23 is interposed between the head portion of the screw member 22 and the disc portion 17*c* of the spool supporting portion 17. Thus, the lid member 23 is fixed to the disc portion 17*c* of the spool supporting portion 17 by the screw member 22.

The restricting portion 21*b* restricts the withdrawal of the rotating member 19 from the spool supporting portion 17. As shown in FIG. 7, the restricting portion 21*b* is disposed on the outer circumferential portion of the mounting portion 21*a*. Each restricting portion 21*b* is disposed on the outer circumferential portion of the mounting portion 21*a* on the radially outward side of each first mounting recess 21*c*. The restricting portion 21*b* extends from the mounting portion 21*a* toward the rotating member 19 (refer to FIGS. 4 and 6).

Here, a plurality of restricting portions 21*b* (for example, three) are integrally formed on the outer circumferential portion of the mounting portion 21*a*. Each restricting portion 21*b* is formed with a convex shape on the outer circumferential portion of the mounting portion 21*a*. The restricting portions 21*b* are disposed at intervals in a direction along the mounting portion 21*a*. For example, the restricting portions 21*b* are disposed at 60-degree intervals in a direction along the mounting portion 21*a*, for example, in the circumferential direction.

As shown in FIGS. 4, 6, and 8, the restricting portion 21*b* restricts the axial movement of the rotating member 19 by engaging the rotating member 19 via the hole portion 17*d* of the spool supporting portion 17 (refer to FIG. 5).

For example, as shown in FIG. 4, each restricting portion 21*b* is guided to each hole portion 17*d* of the spool supporting portion 17 (tubular portion 17*b*) by each guide groove 17*e* of the spool supporting portion 17 (tubular portion 17*b*). In particular, each restricting portion 21*b* is disposed in each guide groove 17*e* of the spool supporting portion 17 (tubular portion 17*b*) by elastic deformation of the arcuate mounting portion 21*a*. In this state, each restricting portion 21*b* is guided to each hole portion 17*d* of the spool supporting portion 17 (tubular portion 17*b*) by each guide groove 17*e* and disposed in each hole portion 17*d*.

The retaining member 21 is thereby positioned on the spool supporting portion 17. In this state, as shown in FIG. 4, the distal end portion of each restricting portion 21*b* on the radially outer side protrudes from the outer circumferential surface of the spool supporting portion 17 (outer circumferential surface of the tubular portion 17*b*). As shown in FIGS.

6 and 8, the distal end portion of each restricting portion 21b is disposed in the annular groove 19c of the rotating member 19.

In this manner, by disposing the distal end portion of each restricting portion 21b in the annular groove 19c, the rotating member 19 is retained with respect to the spool supporting portion 17 and is rotatable relative to the spool supporting portion 17.

Assembling the Spool Supporting Structure

The spool supporting structure 15 is assembled in the following manner. First, the rotating member 19 is disposed on the radially outward side of the spool supporting portion 17. In this state, the annular groove 19c of the rotating member 19 is disposed opposing each hole portion 17d of the tubular portion 17b of the spool supporting portion 17 in the radial direction.

Next, the adjustment dial 20 is disposed in the annular recess 17f of the spool supporting portion 17 between the shaft supporting portion 17a and the tubular portion 17b of the spool supporting portion 17 in the radial direction. In this state, the annular lid member 23 is disposed on the inner surface of the disc portion 17c of the spool supporting portion 17.

Next, the retaining member 21 is attached to the spool supporting portion 17. In particular, as described above, the restricting portions 21b of the retaining member 21 are disposed in each hole portion 17d of the spool supporting portion 17 by elastic deformation of the mounting portion 21a of the retaining member 21. The retaining member 21 is thereby positioned in the circumferential direction with respect to the spool supporting portion 17.

In addition, in this state, the outer circumferential portion of the mounting portion 21a of the retaining member 21 abuts the inner circumferential portion of the tubular portion 17b of the spool supporting portion 17. As a result, the movement of the retaining member 21 in the radially outward direction with respect to the spool supporting portion 17 is restricted.

Furthermore, in this state, the distal end portion of the restricting portion 21b is disposed in the annular groove 19c of the rotating member 19. As a result, the rotating member 19 is retained in the axial direction with respect to the spool supporting portion 17 by the retaining member 21 (distal end portion of the restricting portion 21b) and is rotatably arranged in the circumferential direction with respect to the spool supporting portion 17.

Finally, a fixing means or device, for example, a screw member 22 is attached to the disc portion 17c of the spool supporting portion 17. As a result, the movement of the retaining member 21 in the radially inward direction is restricted by the screw member 22 (for example, the head portion). In addition, the lid member 23 is fixed to the disc portion 17c of the spool supporting portion 17 by the screw member 22 (for example, the head portion).

A spool supporting structure 15 assembled in this manner is attached to the reel body 1 in the following manner.

Each bayonet 19d of the rotating member 19 shown in FIG. 3 is disposed in each guide recess 7e of the reel body 1 (opening 7d) shown in FIG. 2A, and the positioning protrusion 17h of the spool supporting portion 17 shown in FIG. 3 is disposed in the positioning recess 7g of the reel body 1 (opening 7d) shown in FIG. 2A.

In this state, the spool supporting structure 15 is pushed into the spool 10 side. At this time, an end portion of the spool shaft 14 is rotatably supported by the shaft supporting portion 17a of the spool supporting portion 17 via the axle bearing 16.

Next, when the rotating member 19 is turned, each bayonet 19d of the rotating member 19 moves in the circumferential direction along each bayonet groove 7f. The bayonets 19d then abut the distal end portions 7h of the bayonet grooves 7f. The spool supporting structure 15 is thereby attached to the reel body 1. The spool supporting structure 15 can be removed from the reel body 1 by carrying out a procedure that is the reverse of the above-described mounting mode.

OTHER EMBODIMENTS

Although embodiments of the present invention were described above, the present invention is not limited to the embodiments, and various modifications can be made without departing from the scope of the invention.

In the embodiment described above, an example is illustrated in which the retaining member 21 is a plate-shaped elastic member, but the retaining member 21 can be a linear elastic member as well. In addition, an example is illustrated in which the retaining member 21 is an elastic member made of metal, but the retaining member 21 can be an elastic member made of resin.

In the embodiment described above, an example is illustrated in which the retaining member 21 is an elastic member, but the retaining member 21 can be a non-elastic member as well. In this embodiment, the retaining member 21 is preferably configured in the following manner.

For example, the retaining member 21 is formed from a plurality of retaining members, and each retaining member has a restricting portion. The restricting portion of each retaining member engages the rotating member 19 (annular groove 19c) from the radially inner side of the spool supporting portion 17 (tubular portion 17b) via the hole portion 17d. In this state, each retaining member is fixed to the spool supporting portion 17 (disc portion 17c) by a fixing means or device, such as a screw member.

In the embodiment described above, an example is illustrated in which the adjustment dial 20 is mounted on the spool supporting structure 15. However, the present invention can be applied to a dual-bearing reel that does not comprise an adjustment dial 20, for example, that does not comprise a spool braking mechanism 30.

In the embodiment described above, an example is illustrated in which the spool 10 is integrally rotatable with the spool shaft 14; however, the spool 10 may be rotatably supported with respect to the spool shaft 14.

What is claimed is:
1. A dual bearing reel, comprising:
a spool around which a fishing line is capable of being wound;
a spool shaft disposed at a rotational center of the spool;
a spool supporting portion configured to support an end side of the spool shaft;
a body portion onto which the spool supporting portion is detachably mounted;
a rotating member disposed between the body portion and the spool supporting portion and rotatably arranged with respect to the spool supporting portion so as to detachably mount the spool supporting portion to the body portion; and
a retaining member disposed between the spool supporting portion and the rotational center, configured to engage the spool supporting portion and the rotating member, and prevent the rotating member from detaching from the spool supporting portion.

2. The dual-bearing reel according to claim 1, wherein the spool supporting portion is disposed between the rotational center and the rotating member in a radial direction.

3. The dual-bearing reel according to claim 1, wherein the spool supporting portion has a hole portion that extends in the radial direction from the rotational center toward the rotating member, and
the retaining member has a mounting portion attached to the spool supporting portion between the spool supporting portion and the rotational center in the radial direction, and a restricting portion extending from the mounting portion toward the rotating member and is configured to restrict axial movement of the rotating member by engaging the rotating member via the hole portion.

4. The dual-bearing reel according to claim 3, wherein the restricting portion engages the rotating member via the hole portion.

5. The dual-bearing reel according to claim 3, wherein the rotating member has an engagement portion disposed between the restricting portion and the spool in the axial direction, and with which the restricting portion is configured to engage.

6. The dual-bearing reel according to claim 3, wherein the spool supporting portion has a tubular portion that is formed in essentially an tubular shape, and
the mounting portion is disposed on an inner circumferential portion of the tubular portion.

7. The dual-bearing reel according to claim 6, wherein the restricting portion is disposed in the hole portion by elastically deforming the retaining member.

8. The dual-bearing reel according to claim 7, wherein the tubular portion has a guide groove for guiding the restricting portion to the hole portion.

9. The dual-bearing reel according to claim 5, wherein the engagement portion is a wall portion formed in essentially an annular shape.

10. The dual-bearing reel according to claim 9, wherein the engagement portion is an annular groove that includes the wall portion, and
the restricting portion is disposed in the annular groove.

11. The dual-bearing reel according to claim 4, wherein the mounting portion is positioned on the spool supporting portion by a fixing member.

* * * * *